G. D. ROSE.
MANUFACTURE OF RESILIENT TIRES.
APPLICATION FILED OCT. 23, 1911.
1,016,096.
Patented Jan. 30, 1912.
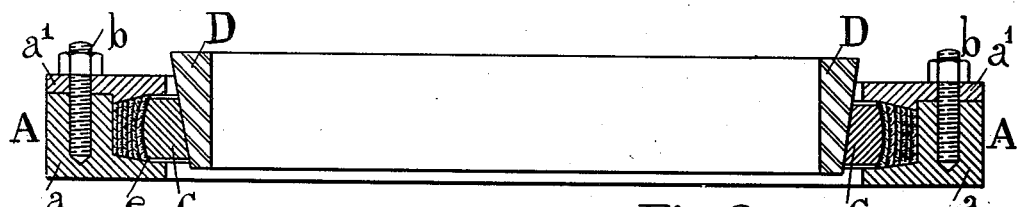
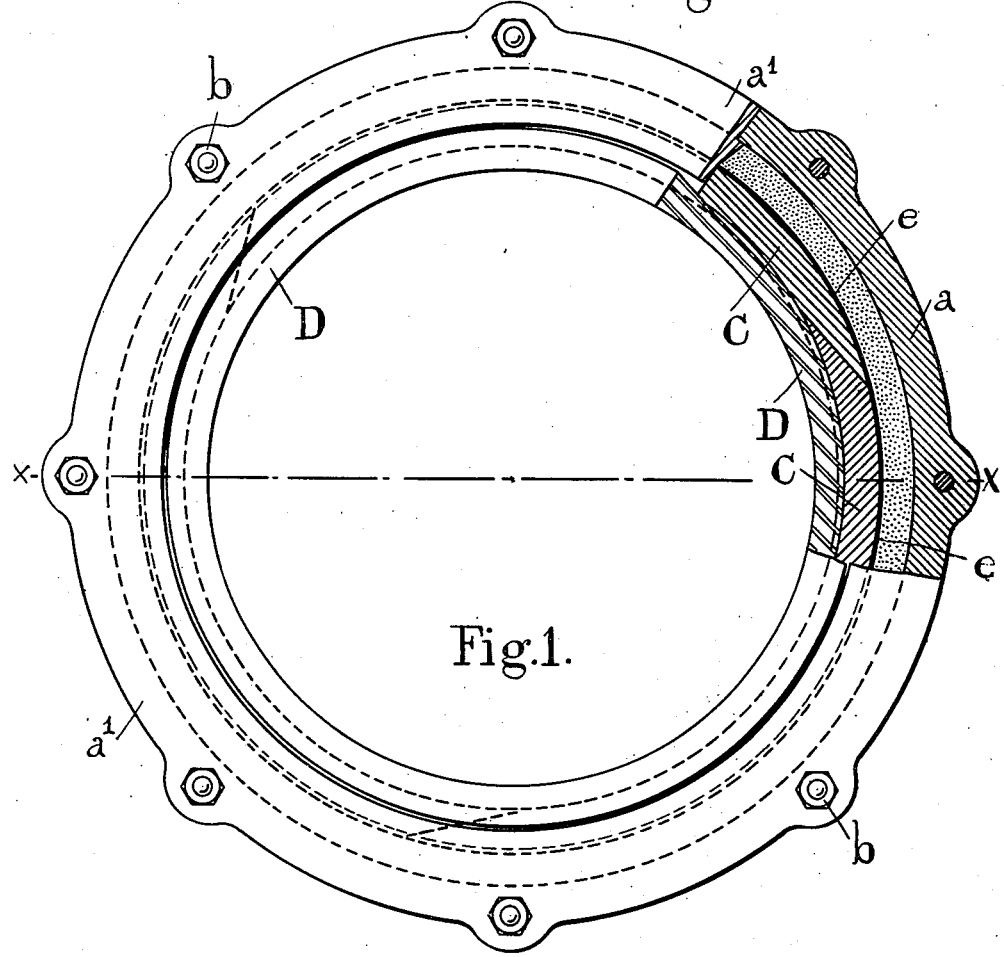
WITNESSES.
INVENTOR.
George D. Rose

G. D. ROSE.
MANUFACTURE OF RESILIENT TIRES.
APPLICATION FILED OCT. 23, 1911.

1,016,096.

Patented Jan. 30, 1912.

2 SHEETS—SHEET 2.

WITNESSES.

INVENTOR.
George D. Rose

UNITED STATES PATENT OFFICE.

GEORGE DAUBNEY ROSE, OF MANCHESTER, ENGLAND.

MANUFACTURE OF RESILIENT TIRES.

1,016,096.  Specification of Letters Patent.  Patented Jan. 30, 1912.

Application filed October 23, 1911. Serial No. 656,264.

*To all whom it may concern:*

Be it known that I, GEORGE DAUBNEY ROSE, a British subject, residing at Manchester, county of Lancaster, England, have invented certain new and useful Improvements in the Manufacture of Resilient Tires, of which the following is a specification.

This invention relates to improvements in the manufacture of resilient tires or covers for tires—either pneumatic or solid—for the wheels of road vehicles—more particularly applicable to tires the tread of which is built up of coir-fiber-fabric though fabric of cotton, flax or other fiber may be employed in a similar manner.

The invention will be described with reference to the accompanying drawings forming part of the specification.

Figure 3:
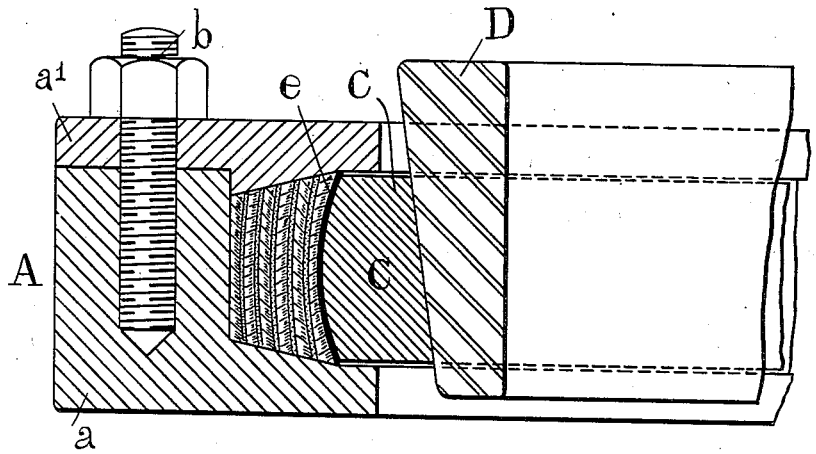
Figure 4:
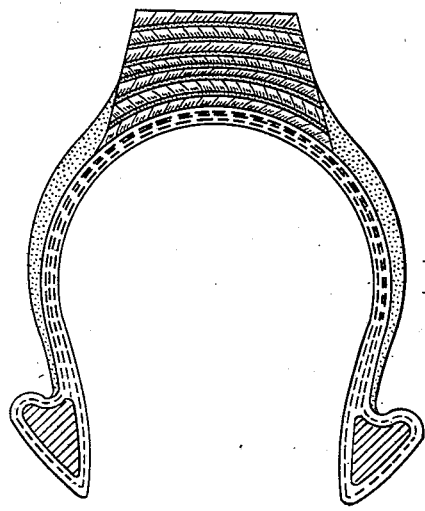

Figure 1 is a plan view partly in section of a mold for compressing the fibers. Fig. 2 is a section on line $x$—$x$ of Fig. 1. Fig. 3 is an enlarged fragmental section of the mold with the tire tread therein. Fig. 4 is an enlarged section of the finished tire.

A narrow flat fabric of coir or other fiber is prepared by weaving or otherwise. This fabric has preferably warps of coir yarn bound together with coir or cotton or other weft, or the warp may be of cotton or other yarn or cord and the weft of coir or other fiber. The fabric is preferably loose and open to allow of the rubber penetrating the interstices of the fabric. The tread of the tire or tire cover is built up of a plurality of layers of this flat fabric, which may be treated or impregnated with rubber solution, and layers of rubber interposed between the layers of fabric and the whole is compressed outwardly until the rubber is caused to permeate the interstices of the fabric.

The fabric is wound circumferentially into the interior of an annular mold A trough shaped in cross section, alternately with the strip or film of rubber until the desired thickness is obtained. The fabric may be wound spirally or each layer may be a separate ring. The annular mold may be in two parts $a$ and $a'$ which are held together by bolts $b$ so as to facilitate the insertion and removal of the fabric or it may be a solid mold. The side walls of the annular trough are tapered as shown and to prevent any pressure being applied to the fabric edgewise thereof this is preferably wound in layers of increasing width inwardly corresponding to the taper of the side walls of the mold.

Pressure is applied to the mold A from the interior outward at right angles to the planes of the fabric layers by a ring C divided into three or more sectional lengths or segments. In the case of the manufacture of a tire tread the periphery of these segments is preferably convex to form the inner side of the tire tread concave to correspond with the contour of the pneumatic tube; for solid tires the periphery of the segments may be flat. The interior of the segmental ring C is beveled or inclined as shown in Fig. 2 to receive an inclined or tapered ram D to force the ring segments outward into the mold to compress the fabric. Pressure is applied to the ram D in any desired way. A thin steel ring $e$ is preferably inserted between the segments of the ring C and the fabric so as to prevent any of the fabric being pressed into the gaps between the different segments of the ring C. After the fabric has been compressed to the desired extent the ram D is withdrawn the ring segments C and ring $e$ removed from the mold, the mold taken apart and the compressed fabric removed therefrom. The compressed fabric is then placed on to an ordinary canvas or other casing and finished in the ordinary way.

What I claim as my invention and desire to protect by Letters Patent is:—

1. The method of constructing tires and tire covers which consists in building up the tread portion thereof of alternate, substantially annular layers of fabric and thin rubber, and subjecting the tread thus formed to outward pressure in a mold, for causing the rubber to permeate the interstices of the fabric and for compressing the latter to the desired shape, size and dimensions, said layers having gradually increasing widths, inwardly, corresponding to the taper of the side walls of the finished tread, to prevent the application of pressure edgewise upon the fabric.

2. The method of constructing tires and tire covers which consists in spirally winding up juxtaposed continuous sheets of fabric and thin rubber to form the tread portion thereof, and subjecting the tread thus formed to outward pressure in a mold, for causing the rubber to permeate the interstices of the fabric and for compressing the latter to the desired shape, size and dimensions, said sheets having gradually increasing widths, inwardly, corresponding to the taper of the side walls of the finished tread, to prevent the application of pressure edgewise upon the fabric.

In testimony whereof I have hereunto set my hand in presence of two subscribing witnesses.

GEORGE DAUBNEY ROSE.

Witnesses:
J. OWDEN O'BRIEN,
GEO. H. O'BRIEN.